(12) United States Patent
Tanno et al.

(10) Patent No.: US 7,990,500 B2
(45) Date of Patent: Aug. 2, 2011

(54) LIQUID CRYSTAL DISPLAY DEVICE

(75) Inventors: Junji Tanno, Chiba (JP); Takahiro Ochiai, Chiba (JP)

(73) Assignee: Hitachi Displays, Ltd., Chiba-ken (JP)

( * ) Notice: Subject to any disclaimer, the term of this patent is extended or adjusted under 35 U.S.C. 154(b) by 151 days.

(21) Appl. No.: 12/219,500

(22) Filed: Jul. 23, 2008

(65) Prior Publication Data

US 2009/0040442 A1 Feb. 12, 2009

(30) Foreign Application Priority Data

Aug. 6, 2007 (JP) ................................. 2007-204330

(51) Int. Cl.
G02F 1/1335 (2006.01)
(52) U.S. Cl. ....................................... 349/114; 349/113
(58) Field of Classification Search .................. 349/113, 349/114
See application file for complete search history.

(56) References Cited

U.S. PATENT DOCUMENTS

| | | | |
|---|---|---|---|
| 6,184,960 B1 * | 2/2001 | Sawayama et al. ........... | 349/139 |
| 6,376,271 B1 * | 4/2002 | Sawayama et al. ............ | 438/30 |
| 7,250,998 B2 * | 7/2007 | Narutaki et al. .............. | 349/114 |
| 7,385,660 B2 * | 6/2008 | Kume et al. ................... | 349/114 |
| 7,551,247 B2 * | 6/2009 | Fujiwara et al. .............. | 349/113 |
| 7,697,099 B2 * | 4/2010 | Kume et al. ................... | 349/138 |
| 2005/0068482 A1 * | 3/2005 | Kume et al. ................... | 349/130 |
| 2005/0117108 A1 * | 6/2005 | Kume et al. ................... | 349/156 |
| 2005/0140916 A1 * | 6/2005 | Kume et al. ................... | 349/156 |
| 2005/0275773 A1 * | 12/2005 | Fujiwara et al. .............. | 349/113 |
| 2005/0275777 A1 * | 12/2005 | Oizumi et al. ................. | 349/114 |
| 2006/0261335 A1 * | 11/2006 | Nakahori et al. ............... | 257/59 |
| 2007/0097303 A1 * | 5/2007 | Sonoda et al. ................ | 349/122 |
| 2007/0126968 A1 | 6/2007 | Uochi | |
| 2007/0126969 A1 * | 6/2007 | Kimura et al. ................ | 349/141 |
| 2007/0146591 A1 * | 6/2007 | Kimura et al. ................ | 349/114 |
| 2007/0146592 A1 * | 6/2007 | Kimura ......................... | 349/114 |
| 2007/0216839 A1 * | 9/2007 | Battersby ...................... | 349/139 |
| 2007/0298538 A1 | 12/2007 | Tanabe et al. | |
| 2009/0201454 A1 * | 8/2009 | Kume et al. ................... | 349/129 |

FOREIGN PATENT DOCUMENTS

| | | |
|---|---|---|
| JP | 2007-121587 | 10/2005 |
| JP | 2007-328210 | 6/2006 |
| JP | 2007-140492 | 10/2006 |
| JP | 2007-183583 | 11/2006 |

* cited by examiner

*Primary Examiner* — K. Cyrus Kianni
(74) *Attorney, Agent, or Firm* — Stites & Harbison PLLC; Juan Carlos A. Marquez, Esq.

(57) ABSTRACT

A liquid crystal display device comprising a liquid crystal display panel that has a first substrate (SUB1), a second substrate (SUB2) disposed so as to oppose the first substrate (SUB1), and a liquid crystal layer (LC) sandwiched between the first substrate (SUB1) and the second substrate (SUB2); wherein the first substrate (SUB1) has a reflective electrode (RAL) having a surface formed in an irregular shape; an organic insulation film (18) formed in a layer above the reflective electrode (RAL); a transparent electrode (19) formed in a layer above the organic insulation film (18); an inorganic insulation film (20) formed in a layer above the transparent electrode (19); and a pixel electrode (PIX) formed in a layer above the inorganic insulation film (20).

9 Claims, 13 Drawing Sheets

LIQUID CRYSTAL DISPLAY DEVICE

CROSS-REFERENCE TO RELATED APPLICATION

The present application claims priority from Japanese application JP2007-204330 filed on Aug. 6, 2007, the content of which is hereby incorporated by reference into this application.

BACKGROUND OF THE INVENTION

1. Field of the Invention

The present invention relates to a liquid crystal display device, and particularly relates to a technique effective for application to a liquid crystal display device having a reflective electrode whose surface is irregular.

2. Description of the Related Art

A semi-transparent liquid crystal display device that operates according to an IPS (In-Plane Switching) scheme is known as an example of an active-matrix liquid crystal display device. In this IPS semi-transparent liquid crystal display device, a reflective electrode is formed in a region that is a portion of a single sub-pixel, whereby semi-transparent (partially transparent) display having a transparent portion and a reflective portion is possible in a single sub-pixel. In an IPS semi-transparent liquid crystal display device, an opposing electrode and a pixel electrode are layered via an insulation film, and a retention capacitor for relatively long retention of a video signal written into the sub-pixel is formed by the insulation film, the opposing electrode, and the pixel electrode.

A reflective electrode is also known in which surface irregularities are formed for diffuse reflection during reflective display. The present invention relates to a liquid crystal display device having a reflective electrode in which surface irregularities are formed for diffuse reflection, and examples of technical references relating to the present invention include Japanese Laid-open Patent Application No. 2007-121587 and Japanese Patent Application No. 2006-160428.

SUMMARY OF THE INVENTION

In an IPS semi-transparent liquid crystal display device, the cell gap length of the liquid crystal layer must be made uniform in order to enhance reflective contrast. However, when the reflective electrode is formed in an irregular shape to perform diffuse reflection, the surface irregularities of the reflective electrode are reflected by the pixel electrode in the upper layer, and the cell gap length of the liquid crystal layer is prevented from being made uniform.

Therefore, when the reflective electrode is formed in an irregular shape, an organic insulation film is effective for use as the insulation film (capacitance insulation film) between the opposing electrode and the pixel electrode. The reason for this is that because an organic insulation film is formed by a coating application method, the irregularities of the base layer can be absorbed, and the surface can be made smooth, i.e., the surface can be flattened, in comparison to an inorganic insulation film formed by CVD or another deposition method. This principle is disclosed in Japanese Laid-open Patent Application No. 2007-121587.

However, an afterimage easily occurs when an organic insulation film is used as the insulation film (capacitance insulation film) between the opposing electrode and the pixel electrode. Since afterimages cause degradation of the display quality, the occurrence of afterimages must be suppressed to the greatest extent possible.

Japanese Patent Application No. 2006-160428 discloses a technique in which retention capacity is increased by using a silicon nitride film having a high dielectric constant in comparison to a photosensitive acrylic resin film as an organic insulation film, or a silicon oxide film as an inorganic insulation film, as the insulation film (capacitance insulation film) between the opposing electrode and the pixel electrode.

An object of the present invention is to provide a technique capable of enhancing reflective contrast and suppressing the occurrence of afterimages in a liquid crystal display device.

This and other objects and novel features of the present invention will become apparent from the description and accompanying drawings in the present specification.

A summary of the main features of the invention disclosed in the present application is given below.

(1) A liquid crystal display device comprising a liquid crystal display panel that has a first substrate, a second substrate disposed so as to oppose the first substrate, and a liquid crystal layer sandwiched between the first substrate and the second substrate; wherein the first substrate has a reflective electrode having a surface formed in an irregular shape; an organic insulation film formed in a layer above the reflective electrode; a transparent electrode formed in a layer above the organic insulation film; an inorganic insulation film formed in a layer above the transparent electrode; and a pixel electrode formed in a layer above the inorganic insulation film; and the reflective electrode is electrically connected to the transparent electrode.

(2) In (1), the organic insulation film is a coating-type insulation film, and the inorganic insulation film is a silicon nitride film.

(3) In (2), the silicon nitride film is a deposited film.

(4) In any of (1) through (3), the organic insulation film is a film for flattening surface irregularities of the reflective electrode.

(5) In any of (1) through (4), the transparent electrode functions as an opposing electrode and a retention capacitor electrode; and an electric field is generated by the pixel electrode and the transparent electrode, and liquid crystals of the liquid crystal layer are driven.

(6) In any of (1) through (4), the transparent electrode functions as a retention capacitor electrode; the second substrate has an opposing electrode; and an electric field is generated by the pixel electrode of the first substrate, and the opposing electrode of the second substrate, and liquid crystals of the liquid crystal layer are driven.

(7) In any of (1) through (6), the liquid crystal display panel has a plurality of sub-pixels and each of sub-pixels has a transparent portion and a reflective portion; each sub-pixel of the plurality of sub-pixels has the reflective electrode, the organic insulation film, the transparent electrode, the inorganic insulation film, and the pixel electrode; and the reflective electrode is disposed in the reflective portion.

(8) In (7), a portion of the organic insulation film is removed in each sub-pixel of the plurality of sub-pixels; and the reflective electrode is electrically connected to the transparent electrode in the portion in which the organic insulation film is removed.

(9) In (7), the liquid crystal display panel has a display portion in which the plurality of sub-pixels is arranged, and a peripheral portion disposed on a periphery of the display portion; and the electrical connection between the reflective electrode and the transparent electrode is made by the peripheral portion.

Below is a brief description of the effects obtained by a typical example of the invention disclosed in the present application.

According to the liquid crystal display device of the present invention, enhanced reflective contrast can be anticipated, and the occurrence of afterimages can be suppressed.

DETAILED DESCRIPTION OF THE INVENTION

Examples of the present invention will be described in detail hereinafter with reference to the drawings. In all of the drawings used to describe the examples of the present invention, the same reference symbols are used to refer to elements that have the same function, and descriptions thereof will not be repeated.

The present example is one in which the present invention is applied to an IPS semi-transparent liquid crystal display device, which is an active matrix liquid crystal display device.

Example 1

Figure 1:
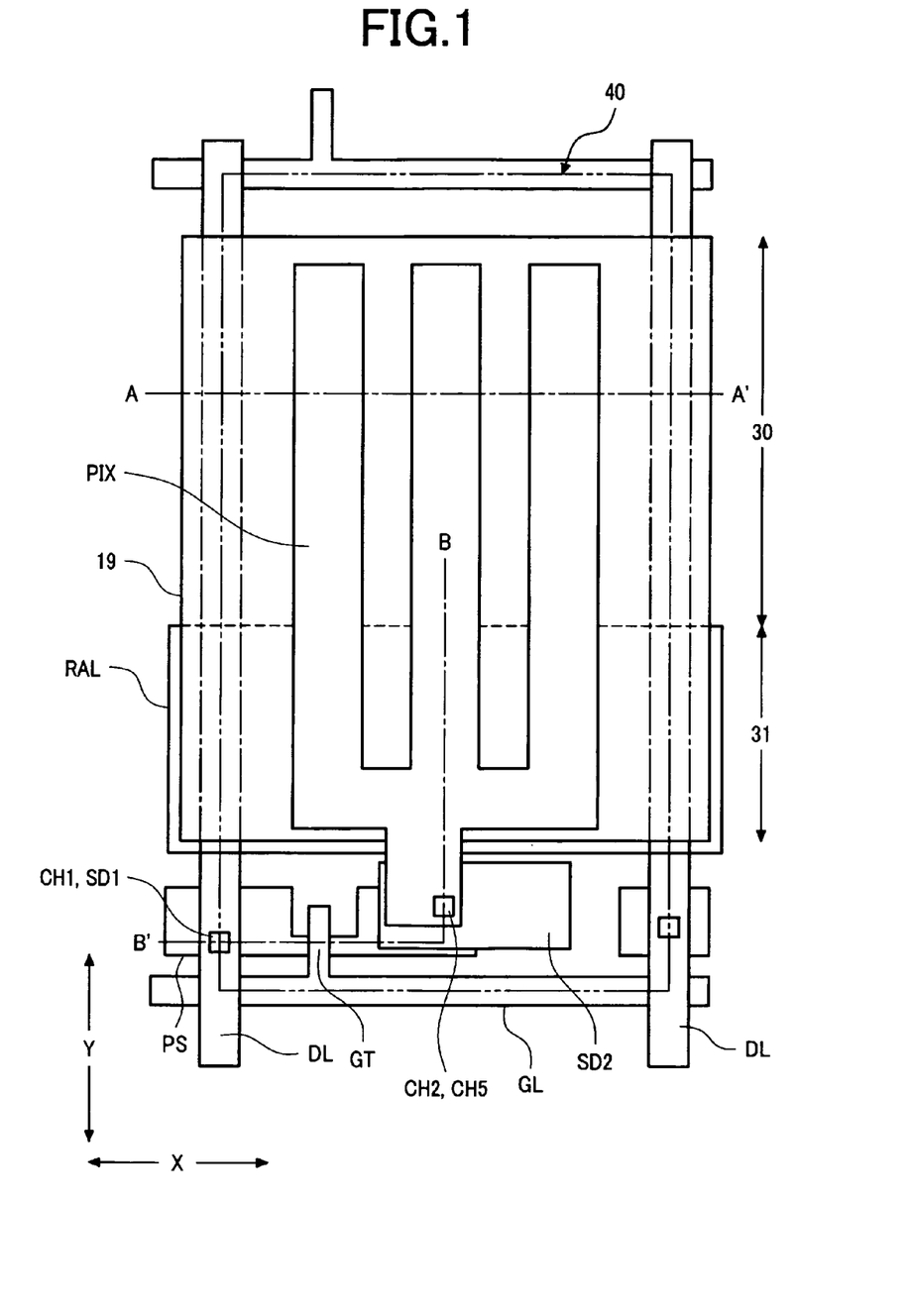
FIG. 1 is a plan view showing the electrode structure of one sub-pixel on the side of the TFT substrate in the IPS semi-transparent liquid crystal display device according to Example 1 of the present invention.
Figure 2:
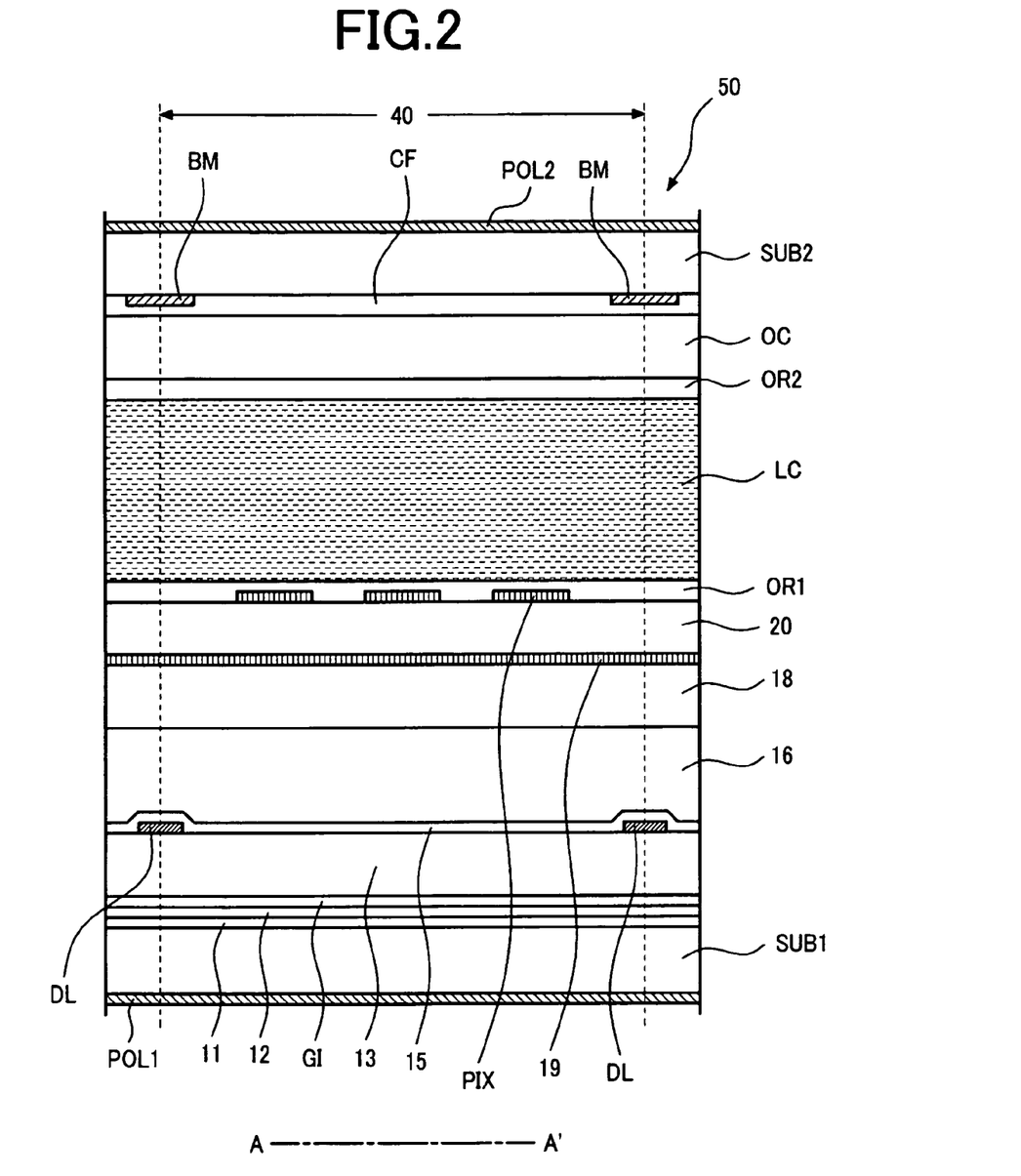
FIG. 2 is a sectional view showing the cross-sectional structure along line A-A' in FIG. 1.
Figure 3:
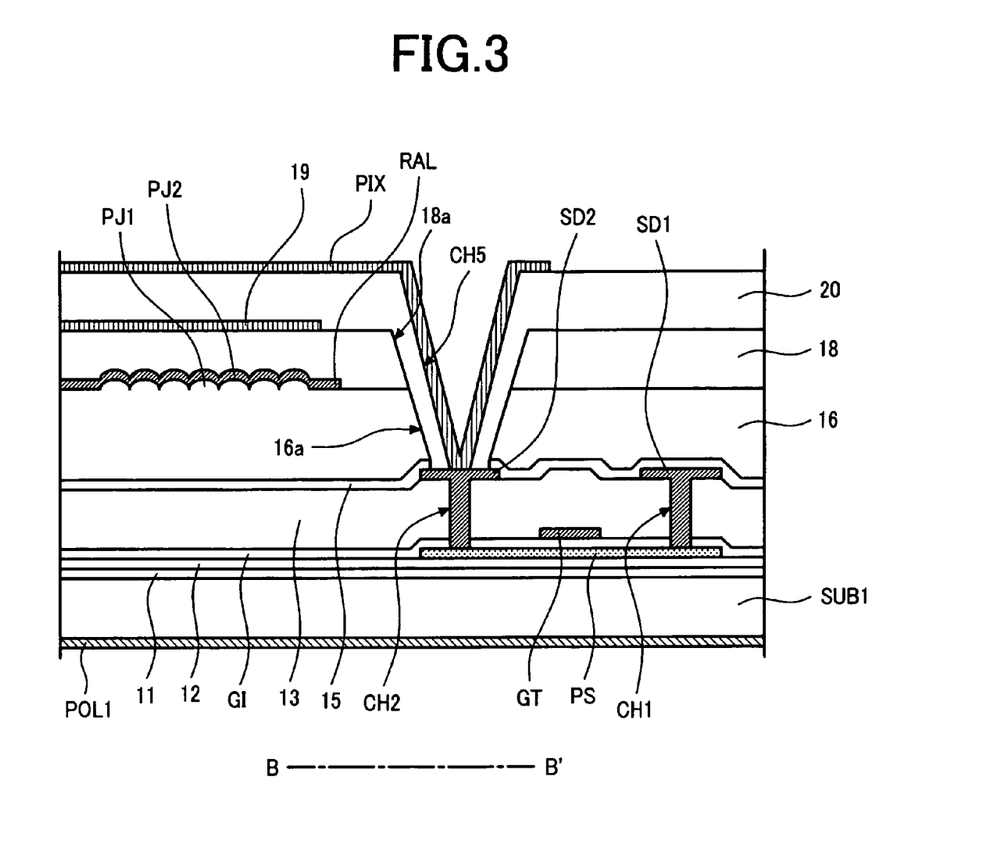
FIG. 3 is a sectional view showing the cross-sectional structure along line B-B' in FIG. 1.
Figure 4:
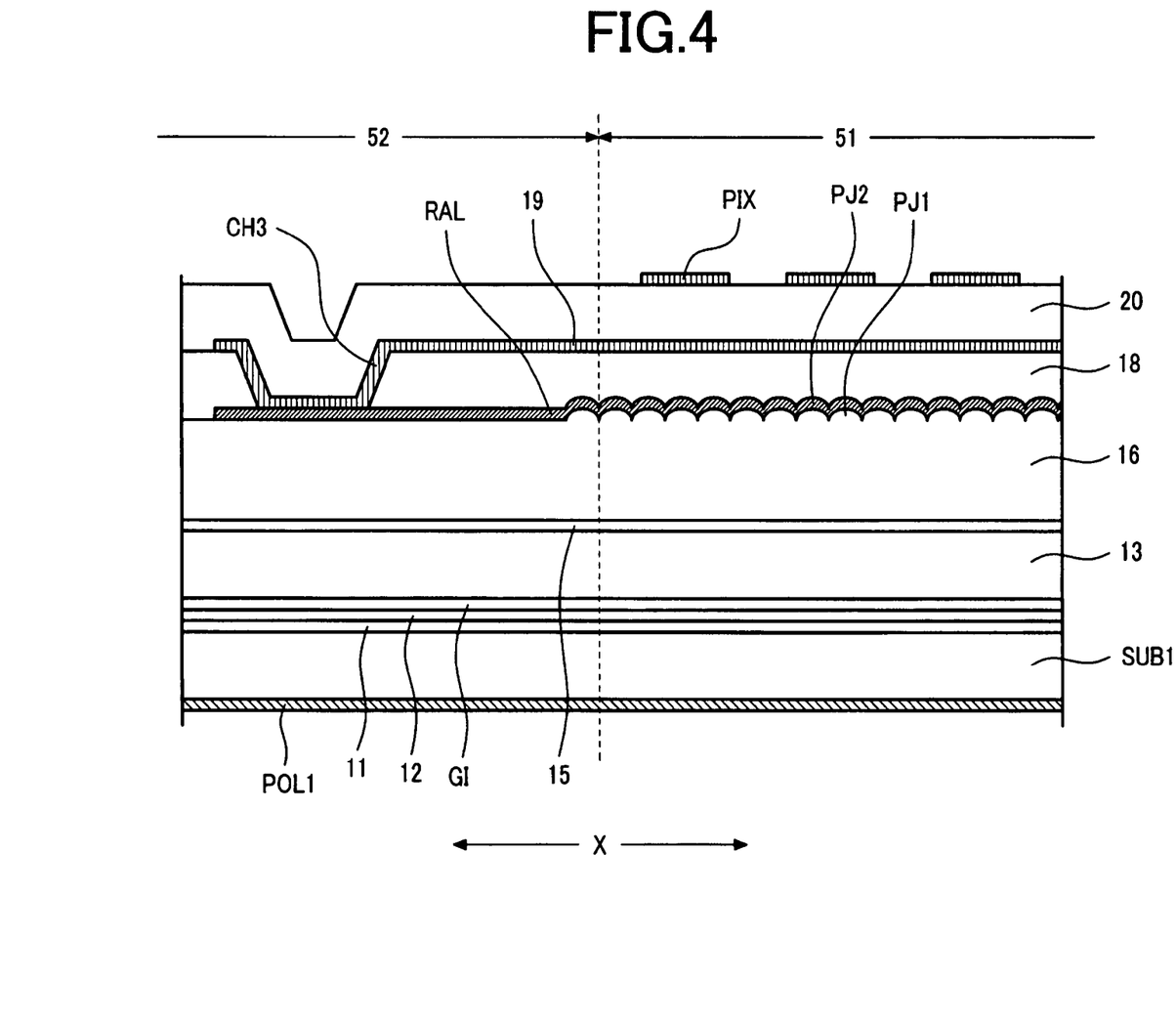
FIG. 4 is a sectional view showing the state of connection between the opposing electrode and the reflective electrode in Example 1 of the present invention.
Figure 5:
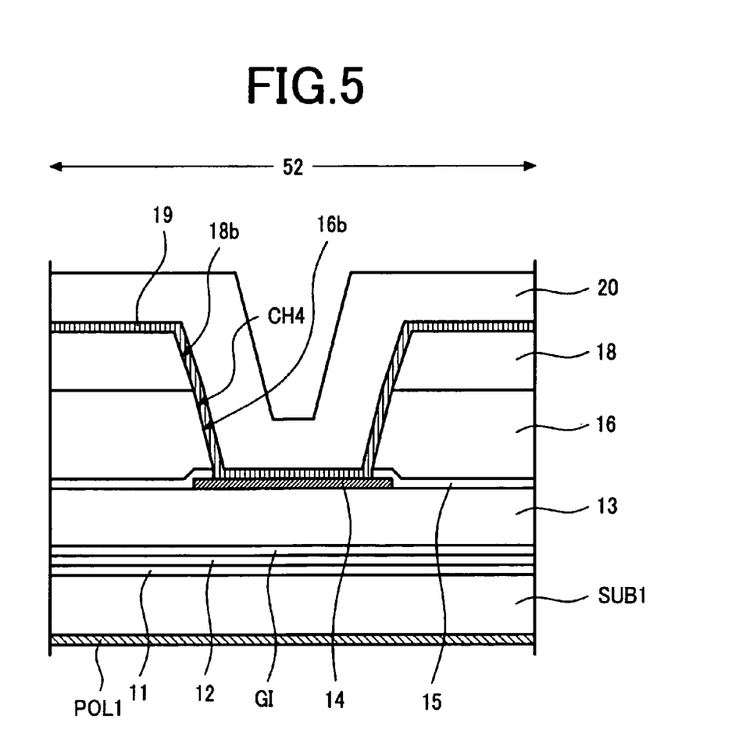
FIG. 5 is a sectional view showing the state of connection between the opposing electrode and the lower-layer wiring in Example 1 of the present invention.

FIGS. 1 through 5, and FIGS. 6A through 6G are drawings relating to the IPS semi-transparent liquid crystal display device according to Example 1 of the present invention, wherein FIG. 1 is a plan view showing the electrode structure of a single sub-pixel on the side of the TFT substrate; FIG. 2 is a sectional view showing the cross-sectional structure along line A-A' in FIG. 1; FIG. 3 is a sectional view showing the cross-sectional structure along line B-B' in FIG. 1; FIG. 4 is a sectional view showing the state of connection between the opposing electrode and the reflective electrode; FIG. 5 is a sectional view showing the state of connection between the opposing electrode and the lower-layer wiring; and FIGS. 6A through 6G are sectional views showing an example (first example) of the manufacturing method.

In FIG. 1, the reference numeral 30 refers to a transparent portion constituting a transmissive liquid crystal display panel, and 31 refers to a reflective portion constituting a reflective liquid crystal display panel. FIG. 2 shows the cross-sectional structure that includes a TFT substrate, a liquid crystal layer, and a CF substrate, and FIGS. 3, 4, and 5 show the cross-sectional structure on the side of the TFT substrate. In FIGS. 3 through 5 the orientation film (OR1) described hereinafter is not shown.

The IPS semi-transparent liquid crystal display device of Example 1 is provided with a liquid crystal display panel 50 (see FIG. 2). As shown in FIG. 2, the liquid crystal display panel 50 has a structure in which a liquid crystal layer (LC) composed of numerous liquid crystal molecules is sandwiched between a first substrate (SUB1) and a second substrate (SUB2), and the side of the principal surface of the second substrate (SUB2) is the observation side. Specifically, the liquid crystal display panel 50 is configured so as to have a first substrate (SUB1), a second substrate (SUB2) disposed facing the first substrate (SUB1), and a liquid crystal layer (LC) sandwiched between the first substrate (SUB1) and the second substrate (SUB2). Glass or another transparent insulating substrate, for example, is used as the first and second substrates (SUB1, SUB2). Positive liquid crystal or negative liquid crystal, for example, is used as the liquid crystal of the liquid crystal layer (LC).

The liquid crystal display panel 50 is configured so as to have a display portion 51 (see FIG. 4) in which a plurality of sub-pixels 40 shown in FIG. 1 is arranged in a matrix, and a peripheral portion 52 (see FIG. 4) disposed on the periphery of the display portion 51. Each of the plurality of sub-pixels 40 has a transparent portion 30 and a reflective portion 31, and furthermore has a pixel electrode (PIX), a transparent electrode 19, and a reflective electrode (RAL). The transparent electrode 19 of Example 1 functions (works) as the opposing electrode and the retention capacitor electrode.

As viewed in a plane, the liquid crystal display panel 50 has scan lines (GL) extending along the X direction, and display lines (DL) extending along the Y direction orthogonal to the X direction in the same plane, as shown in FIG. 1. A plurality of scan lines (GL) is arranged at prescribed intervals in the Y direction, and a plurality of display lines (DL) is arranged at prescribed intervals in the X direction. The plurality of scan lines (GL) intersect with the plurality of display lines (DL) via an insulation film, and thin-film transistors (TFT) used as switching elements of the sub-pixels 40 are provided near the intersections where the scan lines (GL) and the display lines (DL) intersect with each other.

Each of the plurality of sub-pixels 40 is arranged in a matrix in the X direction and the Y direction, a single display line is composed of a plurality of sub-pixels 40 arranged in the X direction, and a plurality of display lines is provided in the Y direction.

As shown in FIGS. 2 and 3, a base film 11, a base film 12, a semiconductor layer (PS), a gate insulation film (GI), a gate electrode (GT), the scan lines (GL), and an insulation film 13 are formed in sequence from the first substrate (SUB1) to the liquid crystal layer (LC) on the side of the liquid crystal layer of the first substrate (SUB1; also referred to as the TFT substrate). A drain electrode (SD1) and a source electrode (SD2) of a thin-film transistor, and the display lines (DL) are formed on the insulation film 13. The SD1 is sometimes referred to as the source electrode, and in this case, the SD2 is referred to as the drain electrode. In the present specification, SD1 is referred to as the drain electrode.

The gate electrode (GT) is integrally formed with the scan lines (GL). Portions of the display lines (DL) double as the drain electrode (SD1), and both are connected in the structure. The drain electrode (SD1) is electrically connected with the drain region (one of a pair of semiconductor regions formed in the semiconductor layer (PS)) of the thin-film transistor via a contact hole (CH1) that reaches from the surface of the insulation film 13 to the semiconductor layer (PS). The source electrode (SD2) is electrically connected with the source region (the other of the pair of semiconductor regions formed in the semiconductor layer (PS)) of the thin-film transistor via a contact hole (CH2) that reaches from the surface of the insulation film 13 to the semiconductor layer (PS).

A silicon nitride film formed by CVD, for example, is used as the base film 11. Silicon oxide films formed by CVD, for example, are used as the base film 12, the gate insulation film (GI), and the insulation film 13. The scan lines (GL) and gate electrode (GT), the drain electrode (SD1) and source electrode (SD2), and the display lines (DL) are formed by conductive films composed of aluminum or another metal, for example.

An inorganic insulation film 15 is formed on the drain electrode (SD1), the source electrode (SD2), and the display lines (DL). An organic insulation film 16 is formed on the inorganic insulation film 15. A reflective electrode (RAL) is formed on the organic insulation film 16. An organic insulation film 18 is formed on the reflective electrode (RAL). The transparent electrode 19 for functioning as the opposing electrode and the retention capacitor electrode is formed on the organic insulation film 18. An inorganic insulation film 20 is formed on the transparent electrode 19. The pixel electrode (PIX) is formed on the inorganic insulation film 20. The pixel electrode (PIX) is electrically connected to the source electrode (SD2) via a contact hole (CH5) that reaches from the surface of the inorganic insulation film 20 to the source electrode (SD2).

Openings (16a, 18a) corresponding to the source electrode (SD2) are formed in the organic insulation film 16 and the organic insulation film 18, respectively, and the inorganic insulation film 20 is formed in the openings (16a, 18a). The contact hole (CH5) is formed in the inorganic insulation film 20 in the openings 16a and 18a.

An orientation film (OR1) is formed on the pixel electrode (PIX). A polarizing plate (POL1) is disposed on the side of the first substrate (SUB1) opposite that of the liquid crystal layer.

Silicon nitride films formed by CVD, for example, are used as the inorganic insulation film 15 and the inorganic insulation film 20. A coating-type insulation films formed by applying, exposing, and patterning a photosensitive acrylic resin, for example, are used as the organic insulation film 16 and the organic insulation film 18.

As shown in FIG. 2, a light-blocking film (BM), a red/green/blue color filter (CF), a protective film (OC), an orientation film (OR2), and the like are formed in sequence from the second substrate (SUB2) to the liquid crystal layer (LC) on the side of the second substrate (SUB2; also referred to as the CF substrate and color filter substrate) towards the liquid crystal layer. A polarizing plate (POL2) is disposed on the side of the second substrate (SUB2) opposite that of the liquid crystal layer.

A phase difference plate or a coating-type phase difference layer may be disposed on at least one of the first substrate (SUB1) and second substrate (SUB2) as needed.

In Example 1, the pixel electrode (PIX) is in a comb electrode structure in which a plurality of linear portions is arranged in a comb pattern at prescribed intervals, for example, but this configuration is not limiting. The transparent electrode 19 is formed so as to be planar. The liquid crystal of the liquid crystal layer (LC) is driven by an electric field generated by the pixel electrode (PIX) and the transparent electrode 19, and a display is created.

The pixel electrode (PIX) and the transparent electrode 19 are formed by ITO (Indium Tin Oxide) or another transparent conductive film, for example. The reflective electrode (RAL) is formed in part of a region of a single sub-pixel 40, whereby a semi-transparent (partially transparent) display can be created that has a transparent portion 30 and a reflective portion 31 in a single sub-pixel 40. Through this configuration, the light from a backlight can be used to perform transparent display in a dark environment, and ambient light can be reflected to perform reflective display in a bright environment.

The reflective electrode (RAL) has a two-layer structure in which the lower layer is a molybdenum tungsten alloy (MoW), and the upper layer is an aluminum silicon alloy (AlSi) containing 1% Si, for example, and the reflective electrode (RAL) is electrically connected to the transparent electrode 19. The electrical connection between the reflective electrode (RAL) and the transparent electrode 19 is formed, for example, via a contact hole (CH3) that reaches from the surface of the organic insulation film 18 to the reflective electrode (RAL) in the peripheral portion 52 of the liquid crystal display panel 50, as shown in FIG. 4.

When the thickness of the liquid crystal layer (LC) must be varied between the transparent portion 30 and the reflective portion 31, a step formation layer is preferably provided to the second substrate (SUB2), for example.

A common potential that differs from the potential applied to the pixel electrode (PIX) is applied to the transparent electrode 19. Consequently, the transparent electrode 19, the pixel electrode (PIX), and the inorganic insulation film 20 constitute a retention capacitor. Specifically, the transparent electrode 19 also functions as a retention capacitor electrode.

The transparent electrode 19 is divided and formed for each display line, for example, and each transparent electrode 19 is electrically connected to wiring 14 to which the common potential is fed, via a contact hole (CH4) that reaches from the surface of the organic insulation film 18 to a connection part of the wiring 14, as shown in FIG. 5. The electrical connection between the transparent electrode 19 and the wiring 14 is formed in the peripheral portion 52 of the liquid crystal display panel 50, for example. The wiring 14 is formed in the same layer as the display lines (DL), for example.

Openings (16b, 18b) that correspond to the connection parts of the transparent electrode 19 and the wiring 14 are formed in the organic insulation films 16 and 18, respectively, and the contact hole (CH4) is formed by the openings 16b and 18b.

As shown in FIG. 3, the reflective electrode (RAL) has an irregular shape having surface irregularities (PJ2) for diffusing and reflecting. The surface irregularities (PJ2) of the reflective electrode (RAL) are formed in reflection of surface irregularities (PJ1) formed in a portion of the organic insulation film 16 that corresponds to the reflective electrode (RAL). The surface irregularities (PJ1) of the organic insulation film 16 can be formed using halftone exposure or the like, for example. Forming a reflective electrode (RAL) having such an irregular shape makes it possible to perform diffuse reflection during reflective display, and enhances display quality.

The inorganic insulation film 20 is formed in a higher layer than the organic insulation films 16 and 18. The organic insulation films 16 and 18 generally do not have high thermal resistance, and the inorganic insulation film 20 in Example 1 is therefore formed by a CVD method at a lower temperature than the film formation temperature of the inorganic insulation film 15. A silicon nitride film having a higher dielectric constant than an organic insulation film or a silicon oxide film is used as the inorganic insulation film 20 in order to increase the retention capacitance.

The organic insulation films 16 and 18 are formed by a coating application method, and the irregularities of the base layer can therefore be absorbed, and the surface can be made smooth, i.e., the surface can be flattened, in comparison to an inorganic insulation film formed by CVD or another deposition method. In Example 1, since the organic insulation film 18 is provided between the reflective electrode (RAL) in which the surface irregularities (PJ2) for diffuse reflection are formed, and the transparent electrode 19 for functioning as the opposing electrode and retention capacitor electrode, the surface irregularities (PJ2) of the reflective electrode (RAL) are absorbed by the organic insulation film 18, and the surface of the organic insulation film 18 is flattened. Specifically, by forming the organic insulation film 18 in a higher layer than the reflective electrode (RAL), and forming the transparent electrode 19 in a higher layer than the organic insulation film 18, the reflection of the surface irregularities (PJ2) of the reflective electrode (RAL) by the higher pixel electrode (PIX) can be suppressed by the organic insulation film. The cell gap length of the liquid crystal layer (LC) can thereby be made uniform, and enhanced reflective contrast can be anticipated even when the reflective electrode (RAL) having the surface irregularities (PJ2) for diffuse reflection formed is used.

In Example 1, since the inorganic insulation film 20 is used as an insulation film between the pixel electrode (PIX) and the transparent electrode 19 that functions as the opposing electrode and the retention capacitor electrode, the occurrence of afterimages can be suppressed in comparison to a case in which an organic insulation film is used. Consequently, enhanced reflective contrast can be anticipated, and the occurrence of afterimages can be suppressed in Example 1.

An example of the manufacturing method of Example 1 will next be described using FIGS. 6A through 6G.

Figure 6A:
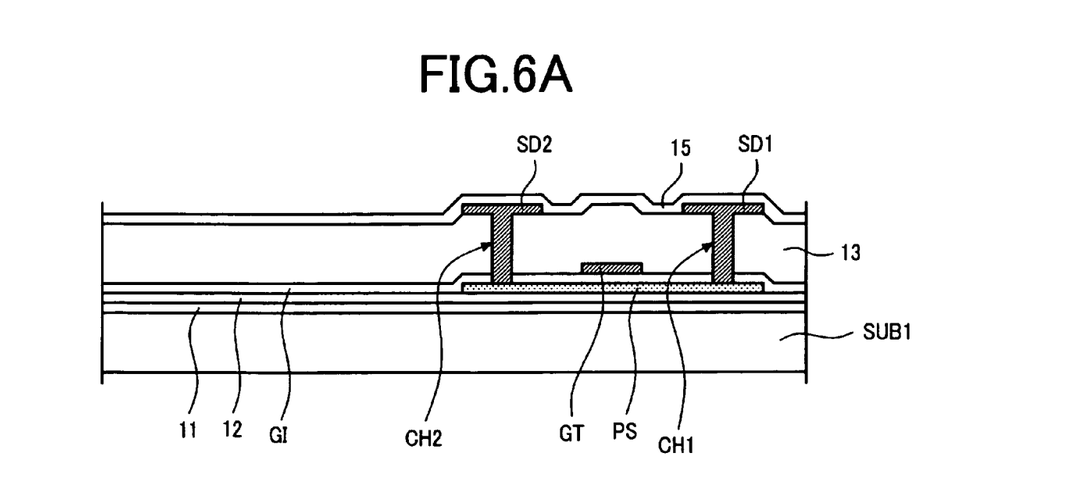
FIG. 6A is a sectional view showing the first step in the manufacturing method according to Example 1 of the present invention.

First, as shown in FIG. 6A, the base films (11, 12), the semiconductor layer (PS), the gate insulation film (GI), the scan lines (GL), the gate electrode (GT), the insulation film 13, the display lines (DL), the drain electrode and source electrode (SD1, SD2), the inorganic insulation film 15, and other components are formed on the first substrate (SUB1).

Figure 6B:
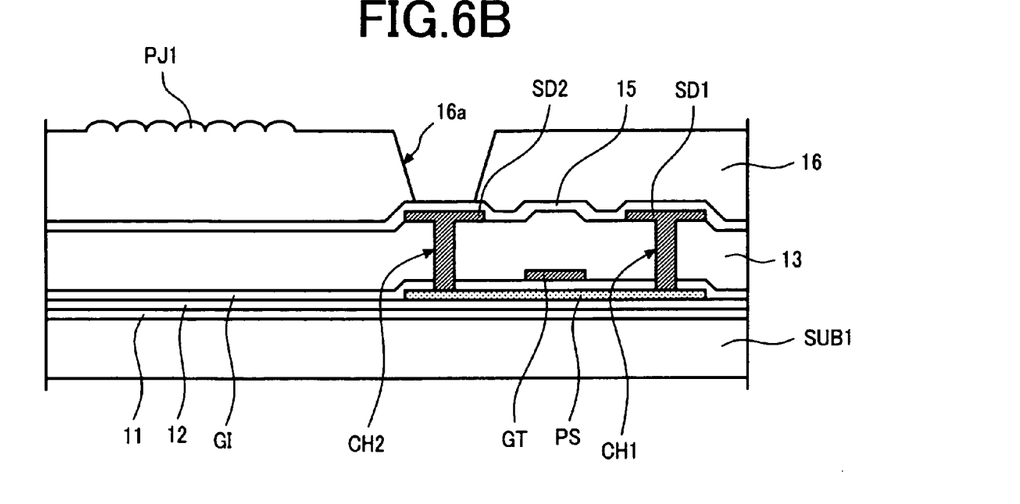
FIG. 6B is a sectional view showing the second step subsequent to FIG. 6A.
Figure 6C:
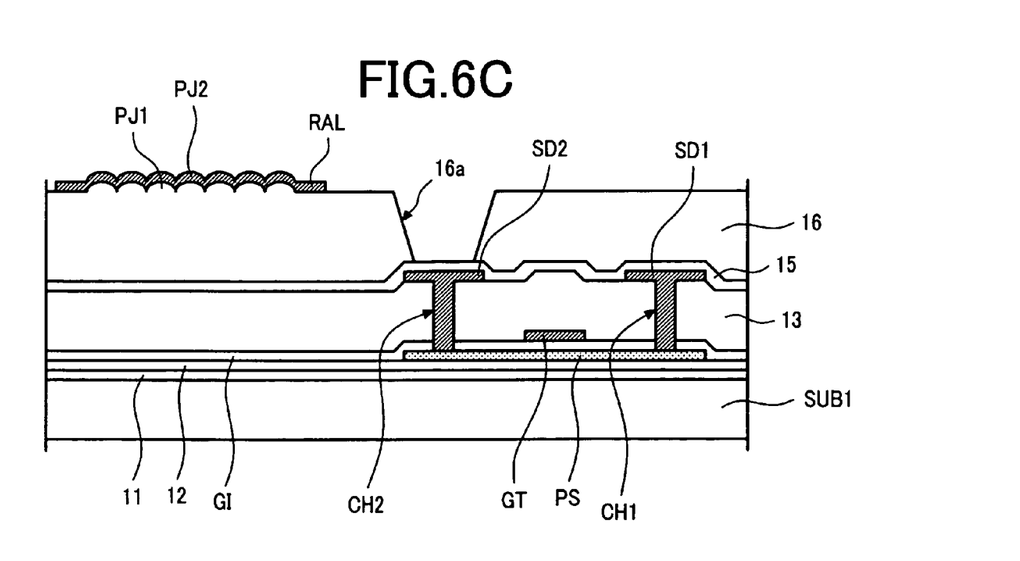
FIG. 6C is a sectional view showing the third step subsequent to FIG. 6B.

The organic insulation film 16 is then formed on the inorganic insulation film 15, as shown in FIG. 6B. The organic insulation film 16 has the surface irregularities (PJ1) in the portion corresponding to the reflective electrode (RAL). The organic insulation film 16 also has the opening 16a in the portion corresponding to the source electrode (SD2), and the opening 16b (see FIG. 5) in the portion corresponding to the connection with the wiring 14. The organic insulation film 16 is formed by application, exposure, and patterning of a photosensitive resin, for example. The surface irregularities (PJ1) of the organic insulation film 16 are formed using halftone exposure or the like, for example. The reflective electrode (RAL) is then formed on the organic insulation film 16, as shown in FIG. 6C. The reflective electrode (RAL) is formed by forming a conductive film composed of a two-layer structure in which the lower layer is a molybdenum tungsten alloy (MoW), and the upper layer is an aluminum silicon alloy (AlSi) containing about 1% Si so that the conductive film covers the surface irregularities (PJ1) of the organic insulation film 16, and then patterning the conductive film. The reflective electrode (RAL) has the surface irregularities (PJ2) for diffuse reflection, and the surface irregularities (PJ2) are formed in reflection of the surface irregularities (PJ1) of the organic insulation film 16.

Figure 6D:
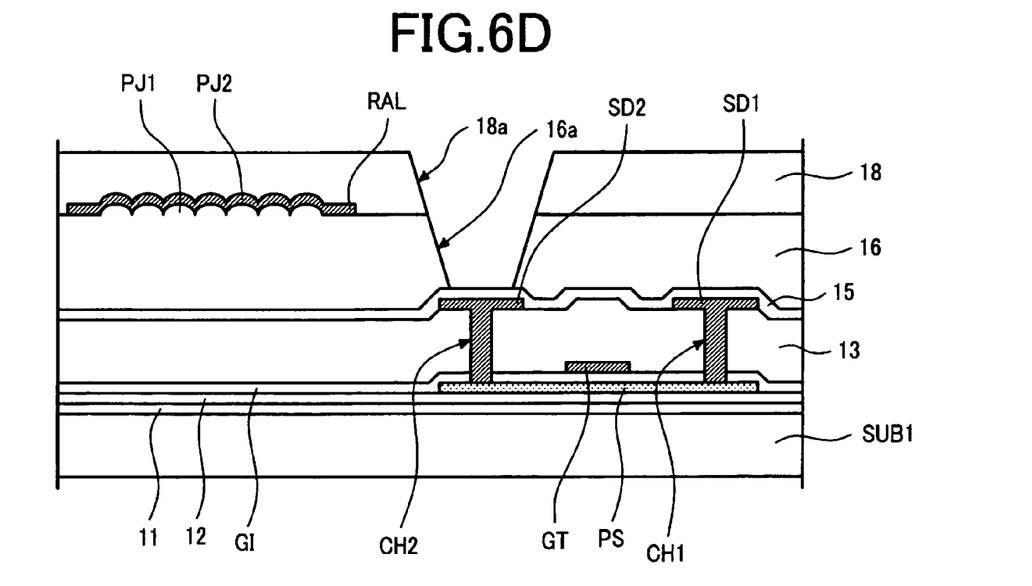
FIG. 6D is a sectional view showing the fourth step subsequent to FIG. 6C.

The organic insulation film 18 is then formed on the organic insulation film 16 so as to cover the reflective electrode (RAL), as shown in FIG. 6D. The organic insulation film 18 has the opening 18a in the portion corresponding to the source electrode (SD2). The organic insulation film 18 has the contact hole (CH3) in the portion corresponding to the connection part of the reflective electrode (RAL), and has the opening 18b in the portion corresponding to the connection part of the wiring 14 in the peripheral portion 52 of the liquid crystal display panel 50, (see FIG. 5). The organic insulation film 18 is formed by applying, exposing, and patterning a photosensitive resin, for example.

Figure 6E:
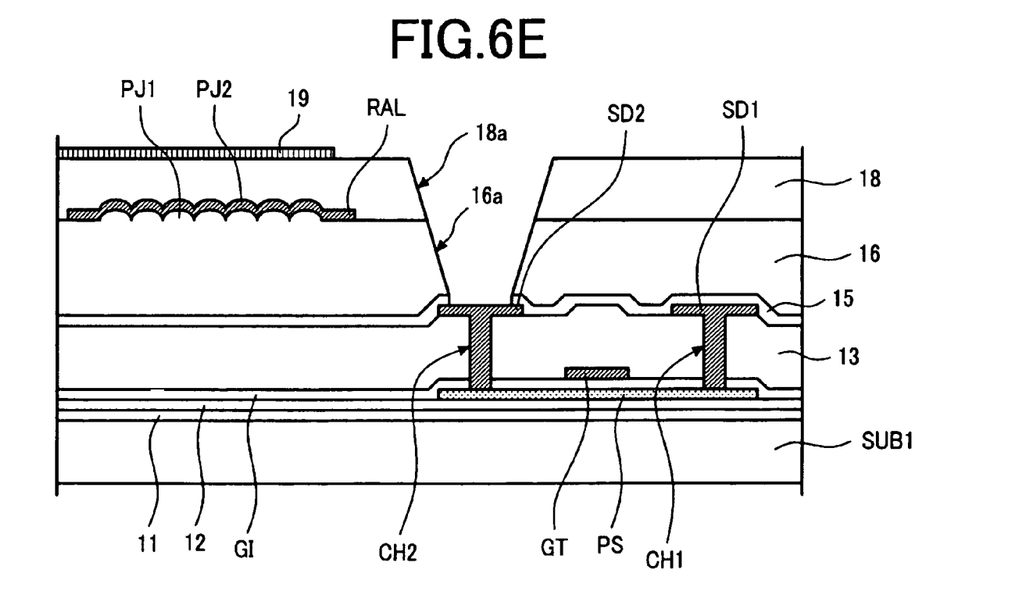
FIG. 6E is a sectional view showing the fifth step subsequent to FIG. 6D.

In this step, the organic insulation film 18 is formed by a coating application method, and the irregularities of the base layer can therefore be absorbed, and the surface can be made smooth, i.e., the surface can be flattened, in comparison to an inorganic insulation film formed by CVD or another deposition method. The transparent electrode 19 composed of ITO or another transparent conductive film is then formed on the organic insulation film 18, as shown in FIG. 6E. The transparent electrode 19 is formed by a process in which the inorganic insulation film 15 in the openings 16a and 18a, and the inorganic insulation film 15 in the openings 16b and 18b (see FIG. 5), are selectively removed, and the connection parts of the source electrode (SD2) and the wiring 14 are exposed, after which a transparent conductive film is formed, and then the transparent conductive film is patterned. The transparent electrode 19 is electrically connected to the connection part of the reflective electrode (RAL) via the contact hole (CH3) in the peripheral portion 52 of the liquid crystal display panel 50, as shown in FIG. 4. The transparent electrode 19 is also electrically connected to the connection part of the wiring 14 via the contact hole (CH4) composed of the opening 16b and the opening 18b in the peripheral portion 52 of the liquid crystal display panel 50, as shown in FIG. 5.

The inorganic insulation film 20 composed of a silicon nitride film, for example, is then formed by a plasma CVD method on the organic insulation film 18 so as to cover the transparent electrode 19. The inorganic insulation film 20 is also formed in the openings (16a, 18a) and the openings (16b, 18b). The organic insulation films 16 and 18 generally do not have high thermal resistance, and the inorganic insulation film 20 in Example 1 is therefore formed by a CVD method at a lower temperature than the film formation temperature of the inorganic insulation film 15. A silicon nitride film having a higher dielectric constant than an organic insulation film or a silicon oxide film is used as the inorganic insulation film 20 in order to increase the retention capacitance.

Figure 6F:
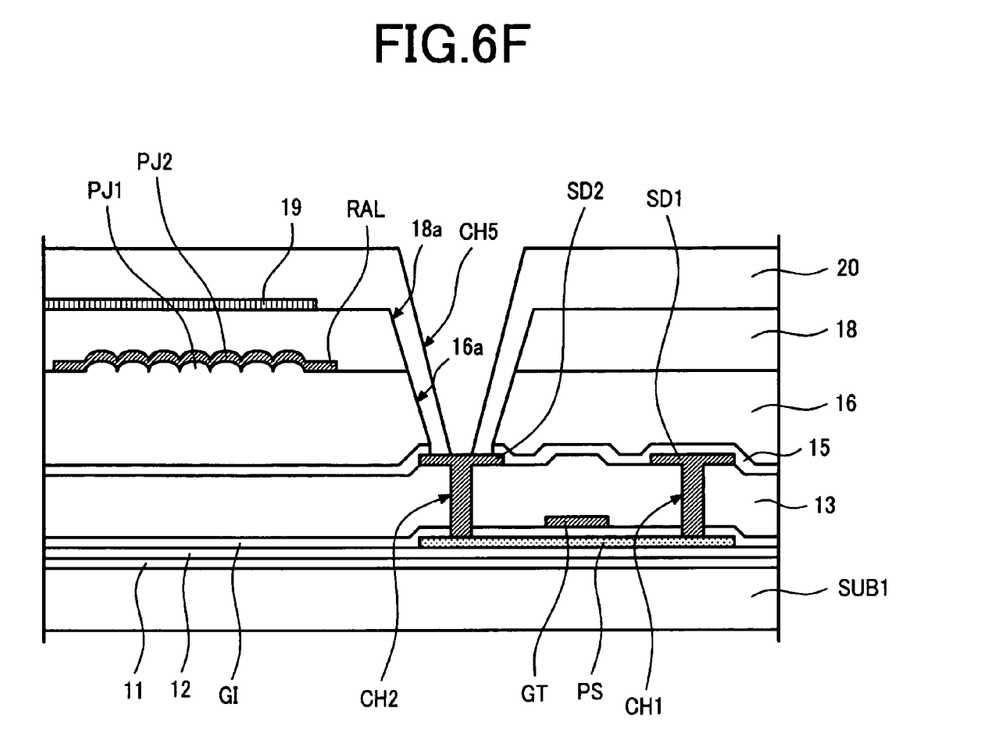
FIG. 6F is a sectional view showing the sixth step subsequent to FIG. 6E.

The inorganic insulation film 20 is then patterned, and the contact hole (CH5) is formed in the portion corresponding to the source electrode (SD2) of the inorganic insulation film 20, as shown in FIG. 6F.

Figure 6G:
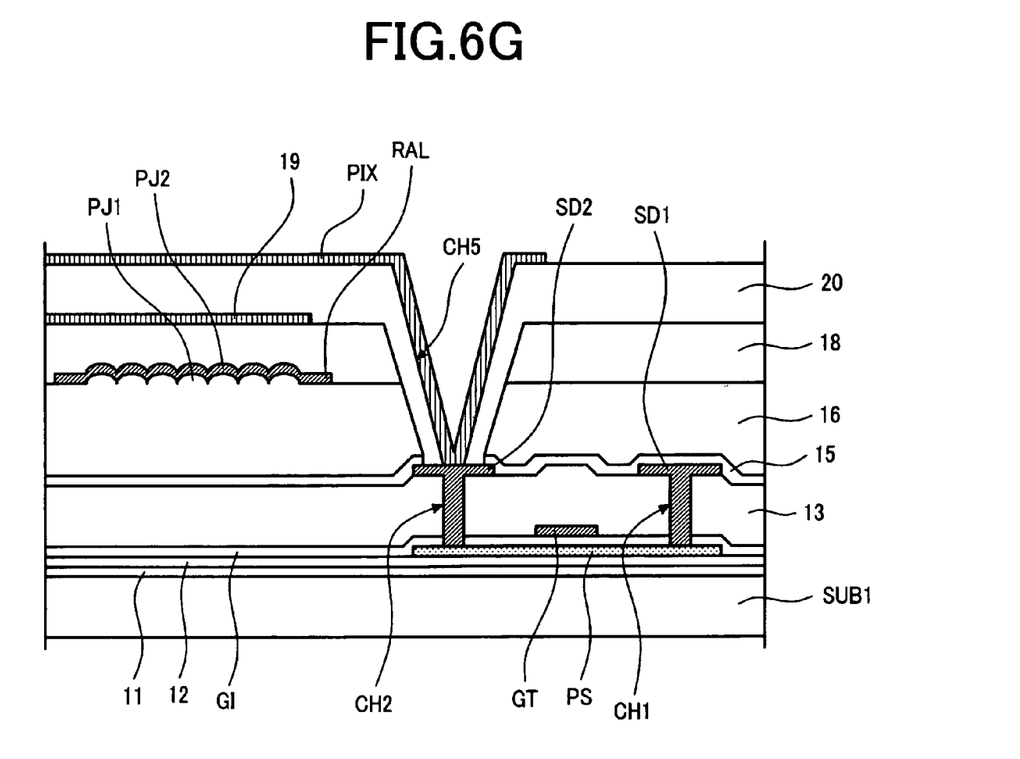
FIG. 6G is a sectional view showing the seventh step subsequent to FIG. 6F.

The pixel electrode (PIX) composed of ITO or another transparent conductive film is then formed on the inorganic insulation film 20, as shown in FIG. 6G. The pixel electrode (PIX) is electrically connected to the source electrode (SD2) via the contact hole (CH5).

In Example 1 as described above, the transparent electrode 19 for functioning as the opposing electrode and retention capacitor electrode is formed via the organic insulation film 18 on the reflective electrode (RAL), which has surface irregularities for diffuse reflection, and the pixel electrode (PIX) is formed on the transparent electrode 19 via the inorganic insulation film 20. Enhanced reflective contrast can therefore be anticipated, and the occurrence of afterimages can be suppressed.

Figure 7:
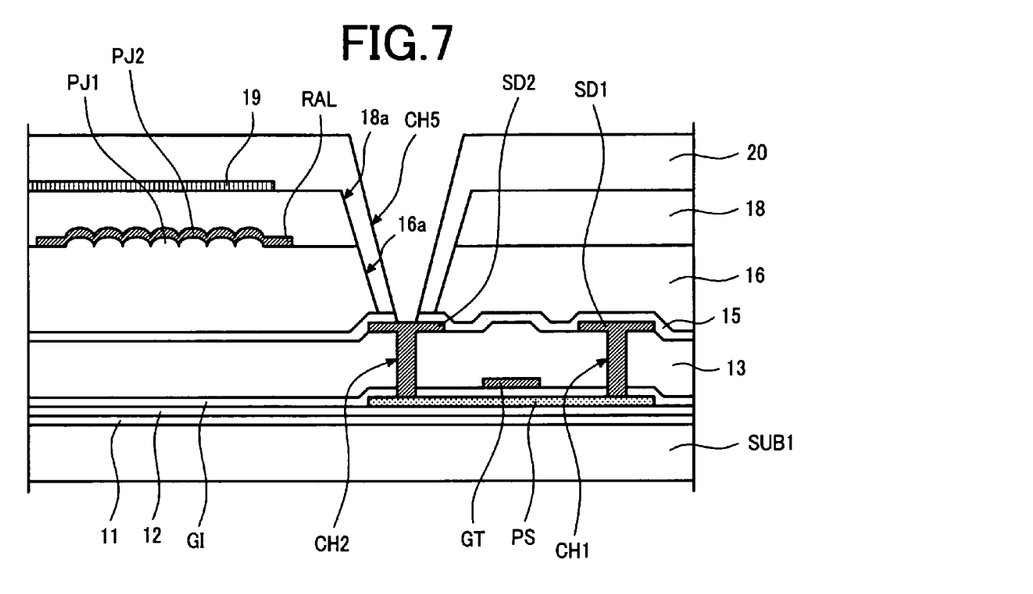
FIG. 7 is a sectional view showing the manufacturing method according to a modification of Example 1 of the present invention.

FIG. 7 is a sectional view showing another example (second example) of the manufacturing method of Example 1.

In the previously described manufacturing method (first example), removal of the portion of the inorganic insulation film 15 corresponding to the source electrode (SD2), and removal of the portion of the inorganic insulation film 20 corresponding to the source electrode (SD2) are performed in separate steps, but because silicon nitride films are used for both the inorganic insulation film 15 and the inorganic insulation film 20, the contact hole (CH5) may be formed by dry etching both films at once, as shown in FIG. 7.

Example 2

Figure 8:
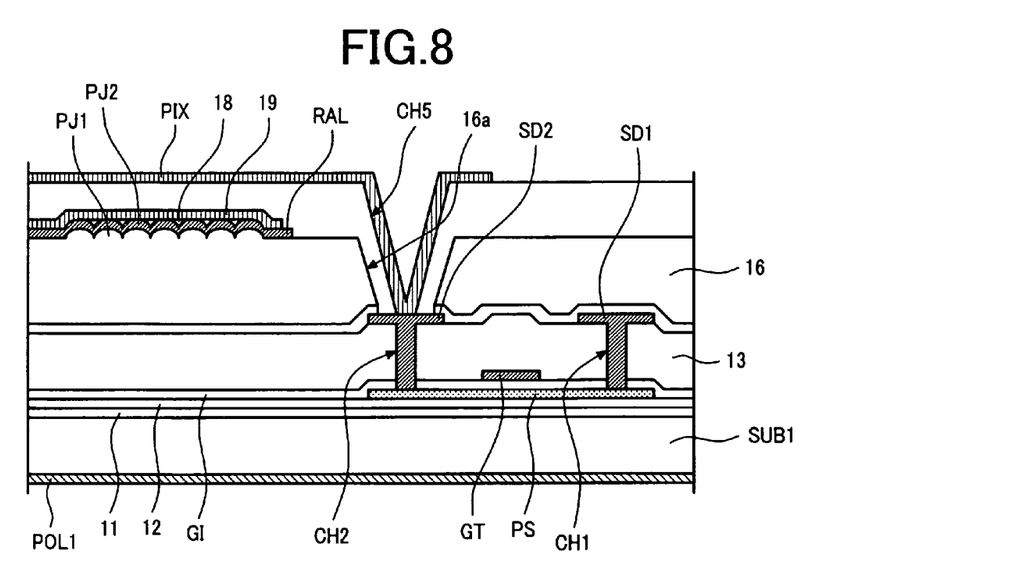
FIG. 8 is a sectional view showing the cross-sectional structure of the liquid crystal display panel on the side of the TFT substrate in the IPS semi-transparent liquid crystal display device according to Example 2 of the present invention.

FIG. 8 and FIGS. 9A through 9E are diagrams relating to the IPS semi-transparent liquid crystal display device according to Example 2 of the present invention, wherein FIG. 8 is a sectional view showing the cross-sectional structure of the liquid crystal display panel on the side of the TFT substrate, and FIGS. 9A through 9E are sectional views showing an example of the manufacturing method.

The orientation film (OR1) is also not shown in FIG. 8, the same as in FIG. 3.

The IPS semi-transparent liquid crystal display device according to Example 2 has basically the same configuration as that of Example 1 described above, but differs in the respects described below.

Specifically, in the previously described Example 1, the electrical connection between the transparent electrode 19 and the reflective electrode (RAL) is made in the peripheral portion 52 of the liquid crystal display panel 50, as shown in FIG. 4, but in Example 2, the electrical connection is made in the single sub-pixel 40, as shown in FIG. 8. An example of the manufacturing method according to Example 2 will be described below using FIGS. 9A through 9E.

Figure 9A:
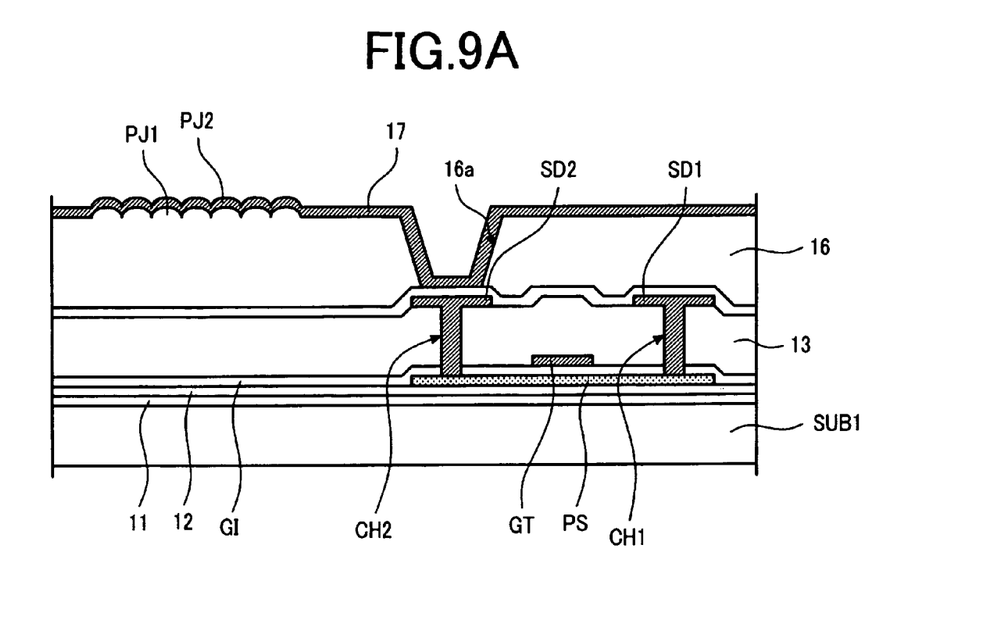
FIG. 9A is a sectional view showing the first step in the manufacturing method according to Example 2 of the present invention.

First, after the organic insulation film 16 is formed on the inorganic insulation film 15 in the same manner as in Example 1, a conductive film 17 is formed on the organic insulation film 16 so as to cover the surface irregularities (PJ1) of the organic insulation film 16, as shown in FIG. 9A. The conductive film 17 has the surface irregularities (PJ2) formed in reflection of the surface irregularities (PJ1) of the organic insulation film 16.

Figure 9B:
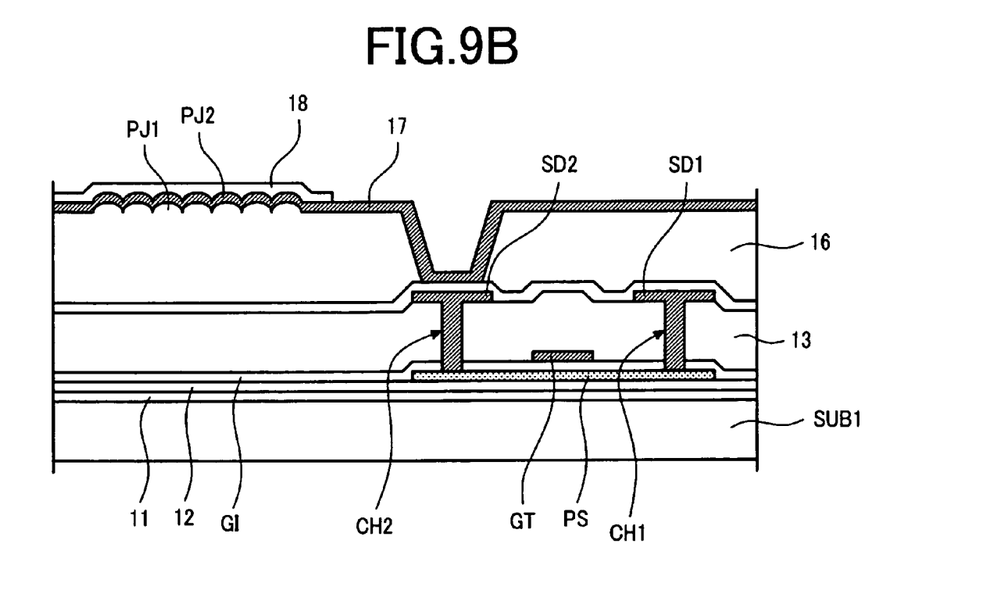
FIG. 9B is a sectional view showing the second step subsequent to FIG. 9A.

The organic insulation film 18 is then formed on the conductive film 17 so as to cover the surface irregularities (PJ2) of the conductive film 17, as shown in FIG. 9B. The organic insulation film 18 is formed by applying, exposing, and patterning a photosensitive resin, for example, but is halftone exposed to reduce the film thickness.

Figure 9C:
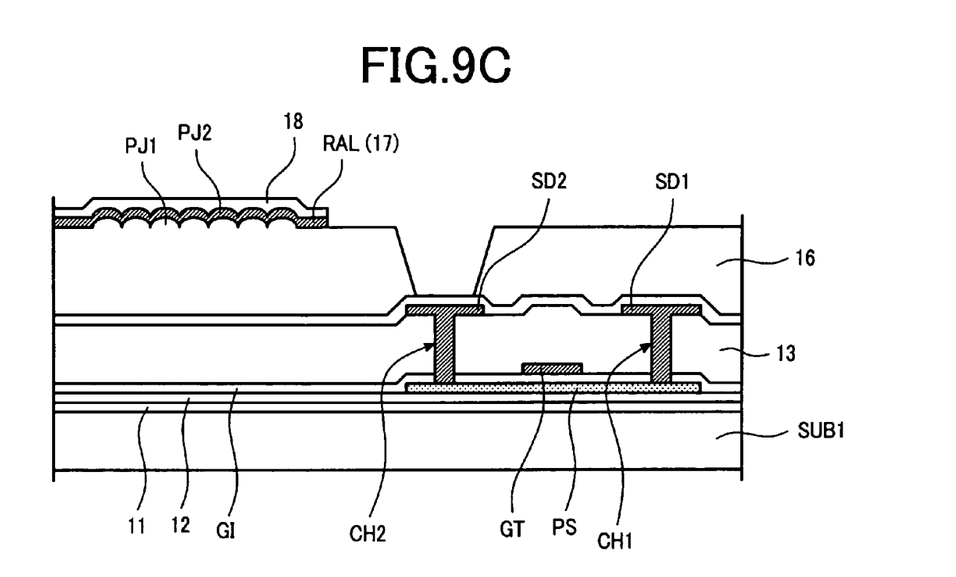
FIG. 9C is a sectional view showing the third step subsequent to FIG. 9B.

The conductive film 17 not covered by the organic insulation film 18 is then etched, and the reflective electrode (RAL) composed of the conductive film 17 is formed as shown in FIG. 9C. The reflective electrode (RAL) has surface irregularities (PJ2) for diffuse reflection, and the surface irregularities (PJ2) are formed in reflection of the surface irregularities (PJ1) of the organic insulation film 16.

Figure 9D:
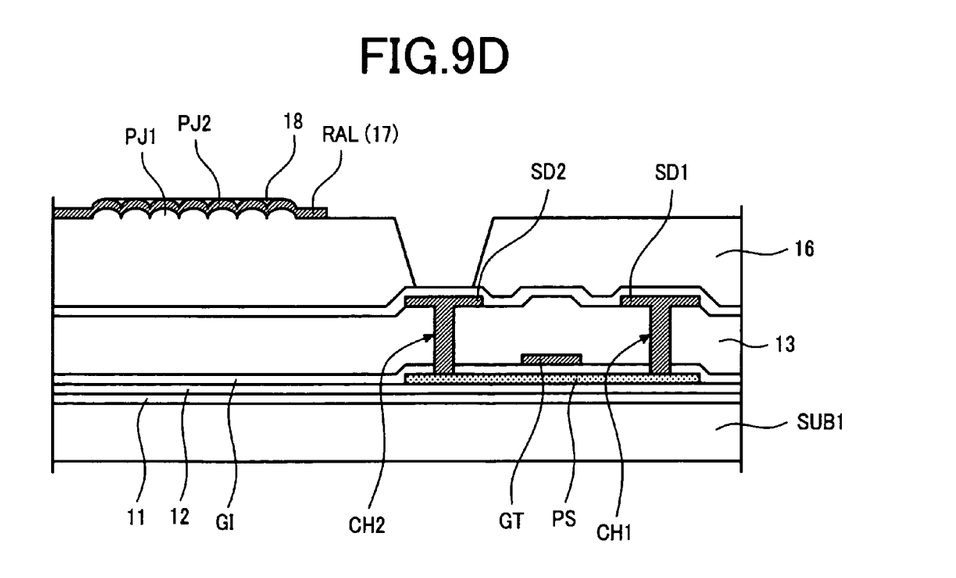
FIG. 9D is a sectional view showing the fourth step subsequent to FIG. 9C.

Ashing is then performed in an $O_2$ asher, the thickness of the organic insulation film 18 is reduced, and the surface of the reflective electrode (RAL) is exposed, as shown in FIG. 9D. The organic insulation film 18 is ashed so that a flat surface is obtained by filling the organic insulation film 18 in between the peaks of the surface irregularities (PJ2) of the reflective electrode (RAL).

Figure 9E:
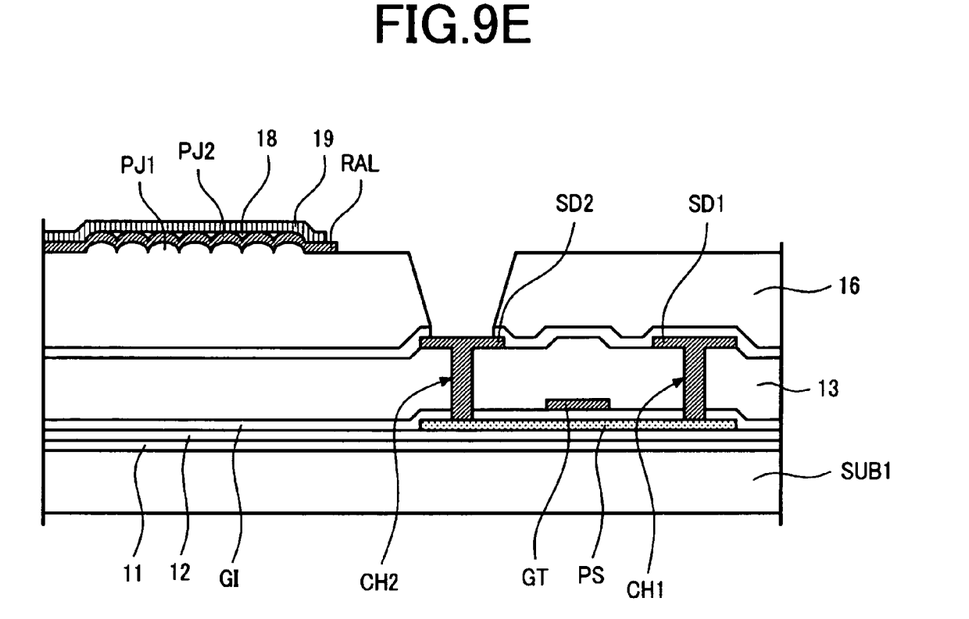
FIG. 9E is a sectional view showing the fifth step subsequent to FIG. 9D.

The transparent electrode 19 composed of ITO or another transparent conductive film is then formed on the reflective electrode (RAL) so as to cover the organic insulation film 18 on the surface irregularities (PJ2) of the reflective electrode (RAL), as shown in FIG. 9E. The transparent electrode 19 is electrically connected to the reflective electrode (RAL) in the portion where the reflective electrode (RAL) is exposed from the organic insulation film 18.

The inorganic insulation film 20 composed of a silicon nitride film, for example, is then formed by a plasma CVD method on the organic insulation film 16 so as to cover the transparent electrode 19, and the inorganic insulation film 20 is then patterned, and the contact hole (CH5) is formed in the portion corresponding to the drain electrode (SD1) of the inorganic insulation film 20.

When the reflective electrode (RAL) is oxidized, and there is a possibility that contact with the transparent electrode 19 is not made, a contact metal may be placed under the reflective electrode (RAL), and the exposed portion (excess portion) of the reflective electrode after treatment in the $O_2$ asher may be re-etched so that contact with the transparent electrode 19 is established.

The same effects as those obtained in Example 1 are also obtained in Example 2.

The invention developed by the inventors was specifically described above based on the examples, but the present invention is not limited by the examples, and may include various modifications within ranges that do not depart from the intent of the present invention.

For example, the examples described above were of applications of the present invention to an IPS semi-transparent liquid crystal display device, but the present invention may also be applied to a vertical-field semi-transparent liquid crystal display device. In a vertical-field semi-transparent liquid crystal display device, the transparent electrode 19 functions as a retention capacitor electrode, and has an opposing electrode on the side of the second substrate (SUB2), an electric field is generated by the pixel electrode (PIX) of the first substrate (SUB1) and the opposing electrode of the second substrate (SUB2), and the liquid crystal of the liquid crystal layer (LC) is driven.

The present invention also is not limited to a semi-transparent device, and may be applied to a liquid crystal display device having a reflective electrode in which surface irregularities for diffuse reflection are formed.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising a liquid crystal display panel that has a first substrate, a second substrate disposed so as to oppose the first substrate, and a liquid crystal layer sandwiched between the first substrate and the second substrate; wherein:
   the first substrate has a reflective electrode having a surface formed in an irregular shape; an organic insulation film formed in a layer above the reflective electrode; a transparent electrode formed in a layer above the organic insulation film; an inorganic insulation film formed in a layer above the transparent electrode; a source electrode formed in a layer below the organic insulation film; and a pixel electrode formed in a layer above the inorganic insulation film;
   the reflective electrode is electrically connected to the transparent electrode,
   the organic insulation film has an opening in a portion corresponding to the source electrode,
   the inorganic insulation film has a contact hole in a portion corresponding to the source electrode,
   the contact hole of the inorganic insulation film is formed within the opening of the organic insulation film,
   the inorganic insulation film is formed within the opening of the organic insulation film and extends within the opening to the source electrode, and
   the pixel electrode is electrically connected to the source electrode via the contact hole.

2. The liquid crystal display device according to claim 1, wherein,
   the organic insulation film is a coating-type insulation film; and
   the inorganic insulation film is a silicon nitride film.

3. The liquid crystal display device according to claim 2, wherein
   the silicon nitride film is a deposited film.

4. The liquid crystal display device according to claim 1, wherein
   the organic insulation film is a film for flattening surface irregularities of the reflective electrode.

5. The liquid crystal display device according to claim 1, wherein
   the transparent electrode functions as an opposing electrode and a retention capacitor electrode; and
   an electric field is generated by the pixel electrode and the transparent electrode, and liquid crystals of the liquid crystal layer are driven.

6. The liquid crystal display device according to claim 1, wherein
   the transparent electrode functions as a retention capacitor electrode;
   the second substrate has an opposing electrode; and
   an electric field is generated by the pixel electrode of the first substrate, and the opposing electrode of the second substrate, and liquid crystals of the liquid crystal layer are driven.

7. The liquid crystal display device according to claim 1, wherein
   the liquid crystal display panel has a plurality of sub-pixels and each of sub-pixels has a transparent portion and a reflective portion;
   each sub-pixel of the plurality of sub-pixels has the reflective electrode, the organic insulation film, the transparent electrode, the inorganic insulation film, and the pixel electrode; and
   the reflective electrode is disposed in the reflective portion.

8. The liquid crystal display device according to claim 7, wherein
   a portion of the organic insulation film is removed in each sub-pixel of the plurality of sub-pixels; and
   the reflective electrode is electrically connected to the transparent electrode in the portion in which the organic insulation film is removed.

9. The liquid crystal display device according to claim 7, wherein
   the liquid crystal display panel has a display portion in which the plurality of sub-pixels is arranged, and a peripheral portion disposed on a periphery of the display portion; and
   the electrical connection between the reflective electrode and the transparent electrode is made by the peripheral portion.

* * * * *